Jan. 19, 1971 J. MRACEK 3,555,659

METHOD AND APPARATUS FOR SEPARATING COMPACT ARRAYS OF ARTICLES

Filed Nov. 18, 1968

INVENTOR
J. MRACEK

By R. P. Miller
ATTORNEY 3,555,659

METHOD AND APPARATUS FOR SEPARATING COMPACT ARRAYS OF ARTICLES

Jaroslav Mracek, Trenton, N.J., assignor to Western Electric Company, Incorporated, New York, N.Y., a corporation of New York Filed Nov. 18, 1968, Ser. No. 776,498
Int. Cl. B23p *19/02*; H05k *13/00*
U.S. Cl. 29—421 17 Claims

ABSTRACT OF THE DISCLOSURE

Methods and apparatus are provided for separating and handling a compact array of microminiature articles, e.g. beam lead devices, in such a manner as to maintain the original, precise orientation. The devices are placed over paramagnetic slugs and are removed selectively from the array by attracting desired slugs towards the devices with a magnetic field to lift selected devices from the array.

BACKGROUND OF THE INVENTION

(1) Field of the invention

This invention relates to the separating and handling of a compact array of articles, and more particularly, to the use of a magnetic field to attract a plurality of paramagnetic slugs toward a compact array of devices, which forces the devices against a plurality of paramagnetic lift members which can be selectively removed with one or more devices attracted thereto.

(2) Technical considerations and prior art problems

In many manufacturing processes it is often necessary to remove articles from compact groups or arrays, without disrupting adjacent articles in the array, so that such articles may be used in assembly operations. Further, it may be desirable to remove batches of articles from an array, where the articles are initially fabricated, and maintain the orginal, precise orientation and relative positions during subsequent testing and evaluation procedures. This maintenance of position of the articles permits correlation of the test results with respect to the positions occupied by the articles during initial fabrication, thus providing information as to effectiveness and quality of the initial fabrication process.

One such process involves the separation and handling of microminiature articles, e.g. beam lead devices, from a particulated semiconductor wafer so that the devices can be bonded or soldered to thin, metallic film contact areas on glass or ceramic wafers. Removing these closely spaced devices with interleaved beam leads which are in a compact array while maintaining their original relative orientation presents several problems.

If the devices become randomly disassociated during separation or removal from the compact array, it is necessary to manually pick up the devices one at a time and reorient them with the aid of a microscope. Also, excessive handling of beam devices may contaminate, break, or otherwise render useless the devices.

It is advantageous, at times, to be able to selectively remove a small number of devices from the compact array without disturbing the other devices. Such removal is useful because adjacent devices, which tend to have similar electrical characteristics, may be removed for use in the fabrication of "matched circuits." When a device is found to malfunction, it is advantageous to know its original location in order to check other devices from the same batch or to re-evaluate the manufacturing process to insure uniform quality in all the devices being fabricated.

SUMMARY OF THE INVENTION

The present invention contemplates a method and arrangement of apparatus in a system for selectively removing one or more articles from an array or batch of closely spaced articles by supporting the array on a group of releasable paramagnetic elements, and then selectively releasing the elements while applying a magnetic field, whereupon the attracted paramagnetic elements lift the selected articles from the array. The articles may be lifted individually or in a group without disturbing or damaging adjacent articles remaining in the array.

In one embodiment, the articles are removed from a compact array by first embedding a plurality of paramagnetic slugs in a solidified fluid, such as a thermoplastic resin ice, or wax, and then placing the articles or fabricating articles on the wax over the slugs. Next, paramagnetic bars, which may be channel shaped, are placed over rows of articles and a magnetic field is applied to the bars as the wax is melted. The slugs are attracted toward the bars forcing the articles against the bars. The bars can be selectively removed and turned over, and the magnetic field removed, leaving the articles sitting on the bars in a row ready to be used. This removal of articles from the array is effected without disturbing adjacent articles and, at the same time, the original precise relative orientation between adjacent removed articles is maintained.

DESCRIPTION OF THE DRAWINGS

Other advantages of the present invention will become apparent upon consideration of the following description in conjunction with the accompanying figures, wherein.

DETAILED DESCRIPTION

Figure 1:
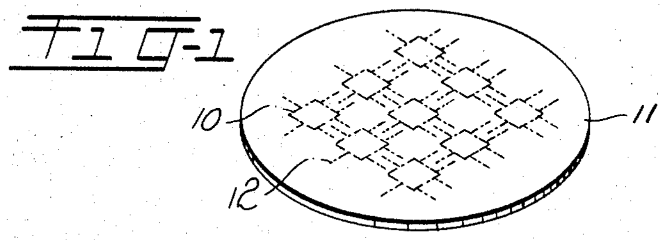
FIG. 1 is a perspective view of a semiconductor wafer with a dashed line, pictorial representation of the manner in which beam lead devices are positioned following particulation of the wafer.
Figure 2:
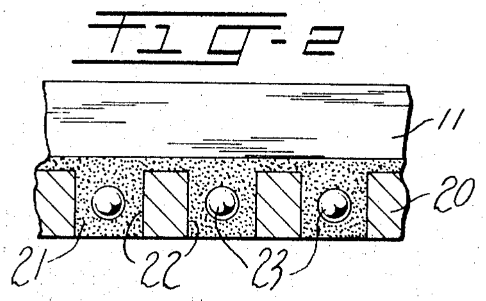
FIG. 2 is a cross-sectional view of the semiconductor wafer of FIG. 1 bonded to a carrier.
Figure 3:
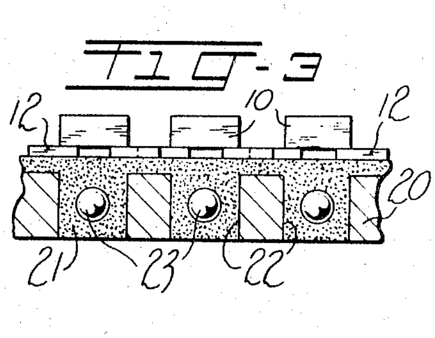
FIG. 3 is a cross-sectional view of the carrier and the array of beam lead devices that remain after excess semiconductor wafer material is etched away.
Figure 4:
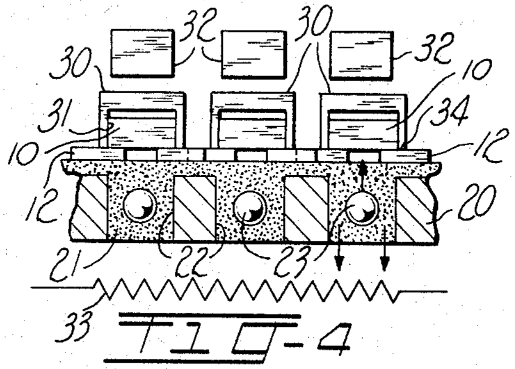
FIG. 4 is a cross-sectional view of the carrier, paramagnetic slugs embedded in wax, beam lead devices and paramagnetic channel bars which may be used to remove beam lead devices from the array and which exemplify features and principles of the invention.
Figure 5:
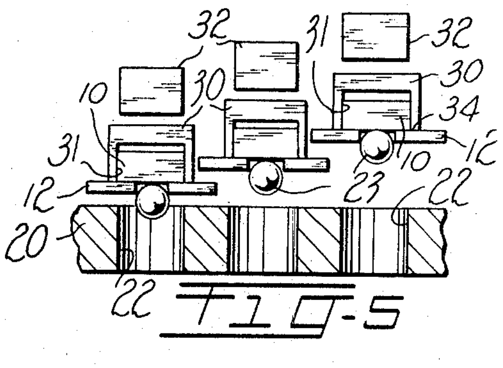
FIG. 5 is a cross-sectional view showing the paramagnetic slugs being attracted by magnet, forcing the beam lead devices into the channel bars.

In order to illustrate and explain the principles and features of the invention, the description will refer to the manufacture, transfer, and handling of beam lead devices, of the type disclosed in the M. P. Lepselter Pat. 3,287,612 issued Nov. 22, 1966. These devices include a minute semiconductive body from which a plurality of thin, metallic leads project in cantilever fashion. It is to be understood that other types of articles may be advantageously handled and transferred by utilization of the invention.

In the production of beam lead devices 10, a wafer or slice of silicon or other semiconductor material 11 has impurities or deposits diffused into its surface in a predetermined sequence. Diffusion occurs at a plurality of selected, discrete locations to produce a regular, compact planar array of devices 10. Usually the devices 10 are in a grid-like pattern with uniformly spaced rows and columns. A film of conductive material, such as gold, is then deposited on the doped semiconductor slice and selectively eroded or etched to form leads 12 for the devices 10. These leads 12 may be interleaved in order to form a more compact array of devices 11, thereby producing more devices for a given amount of wafer material.

In accordance with the instant invention, the semiconductor wafer 11 is bonded to a base plate or carrier 20 (see FIG. 2) with a fluid that may be solidified or a solid that may be dissolved, e.g. a wax or other thermoplastic material 21. Once bonded, the excess semiconductor material between devices is removed by selective etching through a mask or resist pattern thereby leaving a matrix or planar array of beam lead devices 10 (see FIG. 3) in a grid-like pattern. The carrier 20, made of nonmagnetic material resistant to etchants, e.g. plastic, sapphire, glass, has a plurality of apertures or circular holes 22 drilled or otherwise formed therein. The holes need not extend through the carrier but may be in the form of cavities. Each aperture or cavity 22 is filled with a solidified gob or plug of thermoplastic material or wax 21 in which is embedded a paramagnetic slug 23. In practice, the slugs are placed in the apertures and fluid wax is poured into the apertures and allowed to solidify. Fluid materials other than thermoplastics may be used, for example, water may be placed in the apertures and frozen to embed the slugs. The slugs 23 may be constructed of a ferrous or other paramagnetic material, and in the drawings the slugs are shown as being spherical in shape. Other shapes, such as cylinders, discs, or cubes, may be utilized. It should be noted that, as illustrated in FIGS. 2–5, each beam lead device 10 is located above a carrier aperture 22 in which a paramagnetic slug 23 is embedded in solidifiable wax 21.

Figure 7:
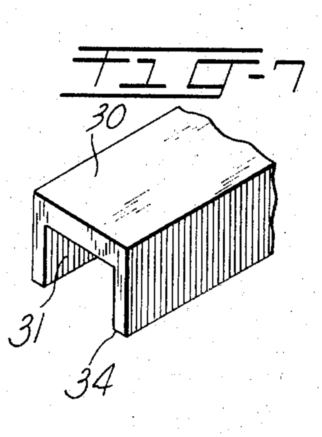
FIG. 7 is a perspective view of one of the channel bars.

In order to lift and transfer the devices 11, a member, such as a paramagnetic, U-shaped plate or channel bars 30 (see FIGS. 4 and 7) is first placed over each row of beam lead devices 10 with a groove 31 of the channel bar facing the devices. A magnet 32, either permanent or electrical, is placed above the channel bar 30 and a resistance or other heating element 33 is positioned below the apertures 22 of the carrier 20. As the heating element 33 melts the wax 21, the devices 10 are released from the carrier 20 and the paramagnetic slugs 23 move, under the influence of the magnet 32, toward the beam lead devices 10 (see FIG. 5) urging and lifting the devices into the groove 31 of the channel bar 30. The melted wax 21 flows out of the bottom of the apertures leaving the devices 10 and the slugs 23 free of wax. As the devices 10 are moved into the groove 31, channel edges 34 serve to engage and support opposed sets of beam leads 12. If bi-wax is used for bonding the wafer 11 to carrier 20 and in the apertures 22, a hot solvent, such as trichloroethylene may be utilized to dissolve the wax, releasing the slugs 23 and the devices 10.

Figure 6:
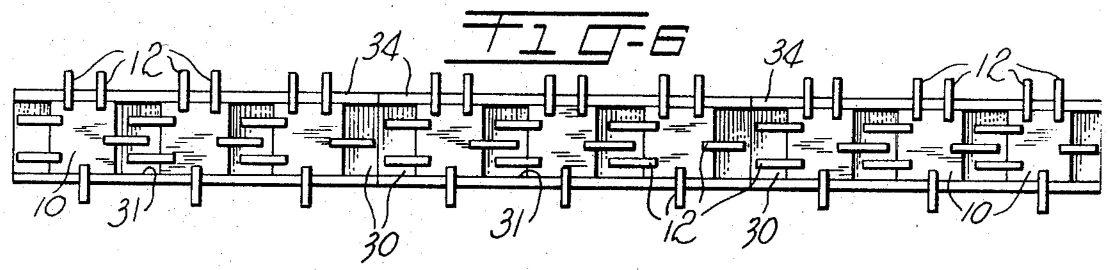
FIG. 6 is a plan view of a plurality of beam lead devices sitting on the channel bars that are aligned in a single row.

Entire rows of the beam lead devices 10 may be simultaneously removed from the compact array of devices by removing the channel bars 30 and magnet 32 in a direction perpendicular to the top surface of carrier 20. It will be noted that the devices 10 are moved from the plane of the array without touching or disturbing the devices remaining in the array. The channel bar 30 is inverted and then the magnet 32 is removed, releasing the paramagnetic slugs 23, resulting in a row of beam lead devices 10 supported on the channel bar. Additional channel bars 30 may be removed, inverted, and placed end-to-end, as shown in FIG. 6 to position the beam lead devices ready for production line use or packaging. The removal of the bars may be accomplished individually or in concert.

Figure 8:
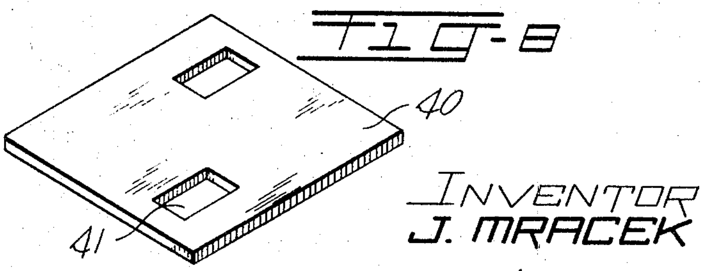
FIG. 8 is a perspective view of an example of one type of mask which may be placed over the beam lead devices to permit selective removal of devices.

The foregoing description gave detailed information for removing full rows of beam lead devices 10 from a compact matrix. At times, it is desirable to remove one or more of the beam lead devices 10 from a row while the remainder of the devices retain their original position in the row. To this end a nonmagnetic mask 40, as shown in FIG. 8, is provided. This mask 40 may be constructed of a nonmagnetic metal or plastic and is provided with apertures 41 having dimensions sufficient to permit the passage of one or more entire devices therethrough. The mask 40, with apertures 41 corresponding to preselected individual devices in various different rows and columns of the compact array of devices 10, is placed over the array of beam lead devices. A plurality of parallel, paramagnetic channel bars 30 are placed on the mask 40. The magnet 32 may be applied to each paramagnetic channel bar 30 and at the same time heat is applied to the wax 21. As the wax 21 melts, the paramagnetic slugs 23 are attracted to the paramagnetic bars 30, but only the devices 10 associated with apertures 41 are permitted to pass into the grooves 31 of the paramagnetic bars 30.

The paramagnetic bars 30 can be removed individually or in concert while maintaining the magnetic field. The bars 30 may be again inverted and the magnetic field removed, releasing the slugs 23, leaving the selected devices 10 positioned in the groove 31 with the beam leads 12 overlying the edges 34 of the channel bars 30 ready for use.

Additional embodiments of the invention for selective removal of the devices 10 may include embedding the paramagnetic slugs 23 only in a pattern of apertures 22 associated with the specific devices 10 that are to be removed. In the alternative, the carrier 20 can be formed with apertures 22 associated only with a pattern of devices 10 to be removed. In either instance, removal of devices 10 from the original array may be accomplished by melting the wax 21 and applying magnetic forces to the released slugs 23 to allow the slugs to move and lift the selected devices into receiving channels 31. A flat paramagnetic plate can be used in place of channel bars 30, in which case, several rows of devices can be lifted simultaneously when it is desired to lift individual devices, a paramagnetic rod with a denticular end may be used to select and remove a single device 10 from the array.

In certain applications, utilizing the principles of the invention, it may be desired to dispense with the use of the paramagnetic members 30 and transfer articles directly to the magnetic bars 32 or to a magnetic plate. In these instances, the method contemplates placing the magnetic bars 32 over the articles to be lifted, and then releasing the paramagnetic slugs 23 by melting or dissolving the wax, whereupon the slugs are attracted and moved to force the articles against the magnetic bars. The magnetic bars with the held articles are lifted and transported to a manufacturing or other utilization area.

It is to be understood that the above-described steps, embodiments and construction of elemental parts are merely illustrative of applications of the principles of the invention, and that many modifications and changes may be made without departing from the invention.

What is claimed is:

1. A method of transferring an article, which comprises:

solidifying a fluid about a paramagnetic element;

supporting the article on the solidified fluid;

applying a magnetic force to said element to urge said element toward said article; and fluidizing said solidified fluid to render effective said magnetic force to attract said element and transfer the article from the fluid.

2. A method of transferring an article from a plate having a cavity formed therein, which comprises:

placing a paramagnetic slug in the cavity;
solidifying a liquid about the paramagnetic slug in the cavity;
placing the article over the cavity;
applying a magnetic force through the article to attract the paramagnetic slug; and
liquifying the solidified liquid to release the slug to move against and lift the article from the plate.

3. In a method of selectively moving an array of said articles:

embedding slugs of paramagnetic material in thermoplastic material in a pattern corresponding to the pattern of articles to be moved;
supporting said array of articles over said thermoplastic material with each article to be removed positioned over a slug;
liquifying said thermoplastic material; and
magnetically attracting and moving said slugs under the articles to move through said thermoplastic material to engage and move said articles.

4. A method of removing articles from a planar array of said articles, which includes:

filling apertures of a carrier with wax;
embedding a paramagnetic slug in each wax filled aperture;
placing the array of articles on said carrier with each article over an aperture;
liquifying said wax; and
applying a magnetic field to move said slugs toward the articles to engage and urge the articles out of the array.

5. A method of particulating a semiconductor wafer having an array of doped areas to form discrete electrical devices, and removing said devices from said array, which comprises:

bonding the semiconductor wafer to a carrier with the doped areas overlying a plurality of wax filled cavities each containing a paramagnetic slug;
removing the semiconductor material between the doped areas to form a discrete electrical device over each of said slugs;
dissolving said bond between said devices and said carrier;
applying a magnetic force to said slugs; and
melting said wax to move said slugs towards the devices to urge the devices from said carrier.

6. A method of fabricating and removing rows of beam lead devices found in a semiconductor wafer and maintaining the accurate orientation of the devices, which comprises:

bonding the semiconductor wafer to a carrier with the beam lead devices individually overlying a plurality of wax filled cavities, each of which contains a paramagnetic slug;
etching away portions of the semiconductor wafer to separate said beam lead devices into rows;
aligning a plurality of paramagnetic channel bars, each having a grooved side, over the rows of beam lead devices with said grooved sides located over rows of devices;
placing a magnet over said paramagnetic channel bars; and
melting the wax in said carrier cavities to free said paramagnetic slugs to move toward said beam lead devices and magnet and hold said devices within said grooved sides with the beam leads overlying the edges of said channel bars.

7. A method for separating and handling a compact array of rows of devices having interleaved beam leads attached:

filling rows of apertures of a carrier with wax;

embedding a paramagnetic slug in each wax filled aperture;
positioning the rows of devices on said rows of wax filled apertures;
aligning a plurality of paramagnetic channel bars with rows of devices inside the channels of the channel bars and the open edges of said channel bars resting on rows of beam leads;
applying a magnetic field to said paramagnetic channel bars;
melting said wax to free said slugs to magnetically move said slugs against the devices to hold said beam leads against said edges of said channel bars;
lifting said channel bars, while maintaining said magnetic field;
inverting said channel bars; and
removing said magnetic field to release said slugs and leave the devices supported by said beam leads resting on said edges of said channel bars.

8. A method for forming and removing a coordinate array of beam lead devices formed in a semiconductor wafer and aligning said devices in a row, each beam lead device has externally extending beam leads which are interleaved with the beam leads of each adjacent device, which comprises:

bonding the semiconductor wafer with wax to a carrier having a plurality of wax filled cavities into each of which is embedded a paramagnetic slug, each beam lead device being positioned in alignment with a slug;
etching away portions of the semiconductor material to form a coordinate array of beam lead devices with interleaved leads;
aligning a plurality of paramagnetic channel bars each having a channel facing a row of beam lead devices with the edges of said channel aligned with said interleaved leads on an individual row of devices;
melting said wax to free said devices and paramagnetic slugs;
positioning a magnet over each paramagnetic channel bar to move the paramagnetic slugs, under the influence of said magnet, towards said devices and said paramagnetic channel bars to move the devices into the channels of said paramagnetic channel bars with said leads overlying the edges of said channels;
lifting a channel bar with the associated magnet, row of beam lead devices and paramagnetic slugs;
turning said channel bar to support the beam lead devices on said edges of said channels;
removing the magnet to release said paramagnetic slugs; and
aligning all channel bars, wth the devices sitting on said channel edges, end-to-end to form a single row of beam lead devices.

9. A method of removing a pattern of articles from a planar array of said articles:

arranging a plurality of paramagnetic elements in a pattern corresponding to the pattern of articles to be removed;
positioning the array of articles adjacent to said pattern of paramagnetic elements with each element aligned with one said article; and
then applying a magnetic force to said elements to move said elements to remove said pattern of articles from the array.

10. In a method of selectively removing a pattern of articles from a planar array of said articles:

embedding a pattern of paramagnetic slugs in wax to correspond to the pattern of the articles to be removed from the planar array of articles;
placing the articles over said paramagnetic slugs;
liquifying said wax;
applying a magnetic field to move the paramagnetic slugs through said liquified wax against the pattern of articles to be removed from said array; and moving said magnetic field and said slugs to remove said pattern of articles from the planar array.

11. In a method of selectively removing a group of articles from a planar array of said articles:

placing paramagnetic slugs in a pattern of apertures in a carrier which are formed to correspond to the group of articles to be removed from the planar array;

filling the apertures with a thermoplastic material;

positioning the planar array of articles on said carrier with the articles aligned with the slugs;

applying heat to melt said thermoplastic material; and magnetically attracting and moving said slugs towards the selected articles to remove the articles from the array.

12. A method for removing specific articles from an array of articles, which comprises:

aligning the array of articles on a corresponding array of wax filled apertures formed in a nonmagnetic carrier;

embedding paramagnetic slugs into the wax in the apertures associated with the specific articles that are to be removed;

positioning paramagnetic members over the articles;

applying a magnetic field to said members; and melting said wax, to release and move said paramagnetic slugs towards the selected articles, under the influence of said magnetic field, thereby urging and holding the articles against said member, moving the members to remove the specific articles from the array.

13. A method for removing specific articles from a compact array of articles, which comprises:

aligning the array of articles on a corresponding array of wax filled apertures formed in a carrier;

placing a nonmagnetic mask having a pluality of openings positioned over the specific articles to be removed from the compact array of articles;

positioning paramagnetic members over the mask and the articles;

magnetizing said members with a magnetic field; and melting said wax to release said paramagnetic slugs and move said slugs towards the articles, under the influence of said magnetic field, through said mask openings, thereby engaging and moving the articles against said members.

14. In a system for transferring articles:

a carrier supporting the articles, having a plurality of holes filled with thermoplastic material located beneath the articles;

a paramagnetic element suspended in each thermoplastic filled hole;

a paramagnetic member positioned over the articles to be transferred;

means for applying a magnetic force to said member to attract the paramagnetic slugs; and means for applying heat to melt the thermoplastic material to permit said slugs to move toward the articles to hold said article against the member, whereafter the member may be moved to transfer the articles.

15. In a system for transferring articles, adhered by a thermoplastic layer to a carrier having a plurality of thermoplastic filled cavities underlying the articles, which comprises:

paramagnetic slugs suspended in the thermoplastic material which fills said cavities;

a plurality of paramagnetic bars, positioned above the articles;

a magnet for applying a force through said bars to attract said paramagnetic slugs; and heating means for melting the thermoplastic material to release said slugs whereupon said slugs move against the articles forcing the articles against said bars, whereafter the bars may be lifted to transfer the articles.

16. In a system for selectively removing a plurality of articles from an array of articles, which comprises:

a carrier having wax filled apertures corresponding to and supporting said compact array of articles;

paramagnetic slugs embedded in said wax filled apertures;

a nonmagnetic mask with a plurality of openings corresponding to the location of the plurality of articles to be removed, placed over the array of articles;

a paramagnetic member placed on said mask;

a magnet placed on said paramagnetic member; and means for liquifying the wax permitting said paramagnetic slugs to move towards the articles, through said mask openings, and forcing said articles against said paramagnetic members, thereby removing the selected articles from the compact array.

17. In a system for selectively removing and transferring a beam lead device from a compact array of devices, wherein each device includes a semiconductor body and a plurality of oppositely disposed projecting beam leads;

a carrier supporting the devices, having a plurality of holes filled with wax located beneath the devices;

a paramagnetic slug embedded in each wax filled hole;

a paramagnetic member having a denticular end positioned over the device to be removed, with the edges of said denticular end positioned over the oppositely disposed leads;

means for applying a magnetic field to said member to attract said slugs; and means for applying heat to melt the wax to free said slug to move towards the device to hold the semiconductor device within said denticular end, with said oppositely disposed leads engaging said edges of the denticular end whereby the articles may be removed and transferred by lifting said rod.

References Cited

UNITED STATES PATENTS

| | | | |
|---|---|---|---|
| 2,511,962 | 6/1950 | Barnes | 51—283 |
| 3,061,919 | 11/1962 | Tack | 29—428 |
| 3,152,939 | 10/1964 | Borneman | 29—423X |
| 3,214,832 | 11/1965 | Schwinghamer | 29—421X |
| 3,243,036 | 3/1966 | Fegley | 29—203X |
| 3,386,156 | 6/1968 | Griesemer et al. | 29—203X |

THOMAS H. EAGER, Primary Examiner

U.S. Cl. X.R.

29—203, 427, 428